United States Patent [19]

Laddha et al.

[11] 4,368,316

[45] Jan. 11, 1983

[54] PROCESS FOR THE PREPARATION OF HIGH-SOLIDS ROSIN-MODIFIED POLYESTERS

[75] Inventors: Sudhir L. Laddha, North Bergen; Theodore Sulzberg, Highland Park, both of N.J.

[73] Assignee: Sun Chemical Corporation, New York, N.Y.

[21] Appl. No.: 155,659

[22] Filed: Jun. 2, 1980

[51] Int. Cl.$^3$ .............................................. C08G 63/48
[52] U.S. Cl. ................................................ 528/295.5
[58] Field of Search .................. 260/22 A, 22 M, 26, 260/DIG. 38; 106/27, 29, 30

[56] References Cited

U.S. PATENT DOCUMENTS

| | | | |
|---|---|---|---|
| 2,060,665 | 11/1936 | Durant et al. | 260/26 |
| 2,065,331 | 12/1936 | Kienle | 260/26 |
| 2,346,968 | 4/1944 | Jeuck et al. | 260/26 |
| 4,040,995 | 8/1977 | Sekmakas et al. | 260/22 CQ |
| 4,079,026 | 3/1978 | Mone | 260/26 |
| 4,100,119 | 7/1978 | Lerman | 260/26 |
| 4,113,793 | 9/1978 | Sekmakas | 260/33.4 R |
| 4,181,638 | 1/1980 | Lasher | 260/22 CQ |

FOREIGN PATENT DOCUMENTS

| | | | |
|---|---|---|---|
| 460737 | 11/1949 | Canada | 260/26 |
| 599521 | 6/1960 | Canada | 260/26 |
| 563554 | 8/1944 | United Kingdom | 260/26 |

*Primary Examiner*—Paul R. Michl
*Attorney, Agent, or Firm*—Cynthia Berlow

[57] ABSTRACT

Low molecular weight, 100-percent solids polyesters, which are useful in printing inks and overprint coatings, are made by the reaction of a polyol, a monobasic aliphatic carboxylic acid, rosin or modified-rosin acid, and a polycarboxylic acid or anhydride.

7 Claims, No Drawings

PROCESS FOR THE PREPARATION OF HIGH-SOLIDS ROSIN-MODIFIED POLYESTERS

BACKGROUND OF THE INVENTION

This invention relates to printing inks and coating compositions. More particularly it relates to printing inks and coating compositions wherein the resin is a 100-percent solids polyester.

Ideal printing inks and overprint coatings have a specific combination of properties that include good gloss, hardness, resistance to pasteurization and chemicals, and the like; these properties previously have been achieved with conventional high molecular weight solvent-based resins. Environmental legislation and the decreased availability of petroleum-based materials, however, have made it essential to eliminate, or at least to severely restrict, solvents in inks and coatings. Accordingly, there has been an increasing need for resin and alkyd systems that are solvent-free and that retain the high performance characteristics of the solvent-based resins.

High-solids polyesters for use in printing inks and coating compositions are known. U.S. Pat. No. 4,040,995, for example, teaches hydroxyl-functional oil-modified polyesters. These resins, the products of the reaction of a diol, a polyhydric alcohol having at least four hydroxyl groups, a dicarboxylic acid, and a saturated oil or fatty acid derived therefrom do not meet the required high performance standards with regard to their properties of pigment wetting, rheology, gloss, chemical resistance, and cure rate with the crosslinking agents used in inks and varnishes.

Hydroxy-functional oil-free polyester resins are disclosed in U.S. Pat. No. 4,113,793. These resins, the products of the reaction of a diol, a polyhydric alcohol having at least three hydroxyl groups, and isophthalic acid likewise fail to meet the high performance requirements with regard to the properties of pigment wetting, cure rate with crosslinking resins, rheology, gloss, and chemical resistance.

In U.S. Pat. No. 4,181,638, there is disclosed very low molecular weight polyesters derived from an aliphatic diol, a cyclic dicarboxylic acid, and a monobasic fatty acid. These materials, which have virtually no acid functionality and low hydroxy functionality, do not adequately wet pigments and give films of insufficient hardness and poor chemical resistance.

It has been determined that suitable resins for printing inks and overprint coatings should be free of volatile solvents. They should have Gardner viscosities of $Z_4$ to $>Z_{10}$ in order that the ink have satisfactory flow; too high a viscosity gives poor tack stability and hence poor transfer of the ink; too low a viscosity results in misting of the ink. The resins should have high acid numbers, generally within the range of about 20 to 90, in order to wet pigments properly and effect a satisfactory cure with crosslinking resins; also they should have high hydroxyl values, usually about 20 to about 400, in order to provide sufficient reaction sites with crosslinking resins so as to obtain cured materials which have a high crosslink density and are resistant to solvents.

BRIEF DESCRIPTION OF THE INVENTION

The polyesters of this invention, prepared by the reaction of a polyol, a monobasic aliphatic carboxylic acid, rosin or modified-rosin acid, and a polycarboxylic acid or anhydride, meet these criteria and result in inks and coatings that are superior to those based on conventional resins in such properties as hardness, gloss, stability, chemical resistance, pigment wetting, cure speeds, and the like.

DETAILED DESCRIPTION OF THE INVENTION

The polyesters of this invention are the products of the reaction of four components, namely (a) a polyol, (b) a monobasic aliphatic carboxylic acid, (c) a rosin or modified-rosin acid, and (d) a polycarboxylic acid and/or anhydride thereof, the ratio of the amounts of (a):(b):(c):(d) being generally about 25–60:5–50:5–95:10–30 parts, and preferably about 30–40:10–30:20–40:5–15 parts based on the weight of the initial charge.

The polyols (a) found most suitable for the polyesters of this invention are triols. Examples include but are not limited to trimethylolethane, trimethylolpropane, glycerol, and hexane triol. The most useful monobasic aliphatic carboxylic acids (b) are those having about 8 to 20 carbon atoms, such as for example stearic acid, lauric acid, palmitic acid, oleic acid, and refined tall oil fatty acid. The rosin or modified rosin (c) may be tall oil rosin, wood rosin, hydrogenated rosin, dehydrogenated rosin, or the like. The polycarboxylic acids or anhydrides (d) include phthalic anhydride, trimellitic anhydride, tetrahydrophthalic anhydride, maleic anhydride, isophthalic acid, fumaric acid, and the like, and mixtures thereof.

The low molecular weight, high performance polyesters of this invention are generally prepared by a two-step process whereby (1) the polyol, the monobasic aliphatic carboxylic acid, and the rosin or modified rosin are reacted at a temperature within the range of about 250° to 290° C., and preferably between about 260° and 280° C., to an acid number within the range of about 1 to 10. Then (2) the polycarboxylic acid or anhydride is added, and the reaction is continued at a temperature within the range of about 150° to 120° C., and preferably between about 170° and 200° C., to an acid number within the range of about 20 to 90, and preferably between about 20 and 50. Thus, all of the monobasic aliphatic carboxylic acid groups and most of the rosin carboxylic acid groups are reacted at about 250° to 290° C., and then the aromatic carboxylic groups as pendant groups are added at about 150° to 210° C.

The hydroxyl value of these polyesters is in the range of about 20 to 400, preferably about 100 to 380, and the molecular weight is in the range of about 100 to 1500, preferably about 500 to 900.

Printing inks and overprint varnishes are prepared from these polyesters by any known and convenient means. They generally comprise a hydroxyl-, carboxyl-functional 100%-solids polyester of this invention and a crosslinking agent. In addition, the ink will contain a colorant and up to about 2, and preferably about 0.5, weight percent of a catalyst. The ratio of the amounts of polyester: crosslinker is generally about 20–70:10–55 parts, and preferably about 50–70:25–35 parts, based on the weight of the ink.

The crosslinking resin is generally liquid and higly branched with a low viscosity, such as for example hexamethoxymethyl melamine or hexamethoxymethyl melamine in which some or all of the methyl ether has been replaced by ethyl, propyl, or butyl ether. Also, alkoxy ureas, benzoguanamines, glycolurils, and the like have been found to be effective crosslinking resins.

Any suitable catalyst may be used, such as for example, p-toluenesulfonic acid, sulfuric acid, nitric acid methanesulfonic acid, phosphoric acid, oxalic acid, or the like.

The coolant may be any of a variety of conventional organic or inorganic pigments, e.g., molybdate orange, titanium white, phthalocyanine blue, and carbon black, as well as dyes used in a conventional amount, i.e., the vehicle may be used in an amount ranging from about 20 to 99.0 percent and the amount of colorant may range fron about 0.1 to 80 percent of the weight of the total composition.

Commonly known modifiers may be incorporated into the formulations using these resins, including plasticizers; wetting agents for the colorant; leveling agents, such as lanolin, paraffin waxes, and natural waxes; slip agents, such as low molecular weight polyethylenes, microcrystalline petroleum waxes, and silicone oils; and the like. Such modifiers are generally used in amounts ranging up to about 3 percent by weight, preferably about 1 percent, based on the total weight of the formulation. Other ingredients conventionally used in inks and coatings can be utilized to modify adhesion, toughness, and other key properties.

The formulations may be prepared in any convenient manner, such as for example in a three-roll mill, a sand mill, a ball mill, a colloid mill, or the like, in accordance with known dispersion techniques.

The inks and coatings of this invention may be applied to the substrate in any known and convenient manner.

The substrate may be metal, wood, molded phenolic or other engineering plastic, and the like; these inks and coatings are particularly suitable for use on metal, e.g., aluminum, tin-free steel, and electrolytic tin-plate.

After application and curing, the inks and coating compositions are tested for their resistance to pasteurization and chemicals and for hardness by the following procedures:

Pasteurization Resistance: The ink is applied to a metal panel and baked at 200° C. for two minutes. The coating panel is then immersed in tap water at 65° C. for 30 minutes; water is wiped from the panel, and Number 610 "Scotch" tape is placed over a scribed "X" on the test panel and then rapidly pulled off. A coating is considered acceptable if there is no more than very slight pull-off.

Chemical Resistance: A printed and baked (two minutes at 200° C.) panel is rubbed 100 times with a cloth soaked in methylethyl ketone. A passing sample will shown no penetration by the solvent through the film.

Hardness: Pencils ranging in hardness from 6B (soft) to 6H (hard) are sharpened to a 15° conical point which is then blunted to a diameter of 1/64–1/32 inch. Each pencil is held at a 45° angle to the plane of the coated panel and pressed against the suface until the coating is damaged. The hardness value is that of the hardest pencil lead that failed to rupture the coating.

The invention will be further understood by referring to the following examples in which all parts are by weight unless otherwise indicated.

EXAMPLE 1

15 Parts of lauric acid and 35 parts of tall oil rosin were charged into a 4-necked glass reactor equipped with thermometer, mechanical stirrer, Dean-Stark trap, condenser, and nitrogen inlet; a 1-liter/minute nitrogen blanket was used. Heating was started and continued until the lauric acid and tall oil rosin formed a homogenous mixture; at 110° C., 40 parts of trimethylolpropane was added and the temperature raised to 280° C. with reaction water being collected from the Dean-Stark trap. The temperature was held at 280° C. until an acid number of 8.2 was reached. The reaction mixture was then cooled to 170° C.; 10 parts of trimellitic anhydride was added, and the temperature held at 170° C. to a final acid number of 35.6. The 100%-solids polyester product was then cooled and discharged. It had a Gardner viscosity of $Z_{10}$, a Brookfield viscosity of 7500 poises, a color of 8, and a hydroxyl number of 360.

EXAMPLE 2

20 Parts of lauric acid and 25 parts of tall oil rosin were charged into a 4-necked glass reactor equipped as in Example 1. Heating was started and continued until the lauric acid and tall oil rosin formed a uniform mixture; at 110° C., 35 parts of trimethylolpropane and 0.2 gram of p-toluenesulfonic acid was added, and the temperature was raised to 260° C. The temperature was held at 260° C. until a 7.6 acid number was reached. The reaction mix was then cooled at 170° C., and 20 parts of trimellitic anhydride was added. The temperature was kept at 170° C., until a final acid number of 39.3 was reached. The 100%-solids polyester product was then cooled and discharged. It had a Gardner viscosity of greater than $Z_{10}$, a Brookfield viscosity of 6000 poises, a color of 9, and hydroxyl number of 200.

EXAMPLE 3

40 Parts of dehydrated castor oil fatty acid and 21 parts of tall oil rosin were charged into a 4-necked glass reactor equipped as in Example 1. Heating was started and continued until the dehydrated castor oil fatty acid and tall oil rosin formed a uniform mixture; at 100° C., 30 parts of pentaerythritol was charged, and the temperature was raised to 270° C. The temperature was held at 270° C. until a 5.1 acid number was obtained. The reaction mix was then cooled to 200° C., and 9 parts of isophthalic acid was added. The temperature was kept at 200° C. until a final acid number of 21.6 was reached. The reaction product was then cooled to 100° C. and discharged. It had a Gardner viscosity of $Z_8-Z_9$, (705 poises), a color of 8, and a hydroxyl number of 295.

EXAMPLE 4

33 Parts of linseed oil fatty acid and 28 parts of hydrogenated tall oil rosin were charged into a 4-necked glass reactor equipped as in Example 1. Heating was started and continued until the linseed oil fatty acid and hydrogenated tall oil rosin formed a solution; at 120° C., 31 parts of trimethylolethane was added, and the temperature was raised to 280° C. The temperature was held at 280° C. until a 4.2 acid number was reached. The reaction mixture was then cooled to 200° C., and 8 parts of phthalic anhydride was added. The temperature was kept at 200° C. until a final acid number of 28.3 was obtained. The resin was then cooled and discharged. It had a Gardner viscosity of $Z_6-Z_7$ (237 poises), a color of 14, and a hydroxyl number of 260.

EXAMPLE 5

40 Parts of the polyester of Example 1, 20 parts of hexamethoxymethyl melamine, 34 parts of phthalocyanine blue, 3 parts of talc, and 1 part of p-toluenesulfonic acid were mixed on a 3-roll mill. 2 Parts of N,N-dimethylethanol amine was then added and the product milled until it distributed uniformly.

The resulting ink was printed onto a flat aluminum panel and baked in an oven at 170° C. for two minutes. The ink had exceptionally good press stability, and the print was sharp, glossy, and tough with excellent solvent resistance and pasteurization resistance and a hardness of 6H.

EXAMPLE 6

(A) 60 Parts of the polyester product of Example 2, 10 parts of hexamethoxymethyl melamine, and 26 parts of red lake C pigment were mixed and milled on a 3-roll mill. 4 Parts of N,N-dimethylcyclohexyl amine was added, and the ink product milled until it distributed uniformly.

(B) A water-based overprint varnish was prepared as follows:

50 Parts of lauric acid and 15 parts of tall oil rosin were charged into a reactor equipped as in Example 1. Heating was started and continued until the lauric acid and the tall oil rosin formed a uniform mixture; at 110° C., 25 parts of trimethylolpropane was added, and the temperature was raised to 270° C. The temperature was held at 270° C. until an acid number of 50.2 was reached. The reaction mixture was then cooled to 170° C., and 10 parts of phthalic anhydride was added. The temperature was held at 190° C. until a final acid number of 85 was reached.

The polyester was then cooled to 50° C. and mixed with 50 parts of hexamethoxymethyl melamine. 4 Parts of N,N-dimethylethanol amine and then 3 parts of p-toluenesulfonic acid and 50 parts of an 80:20 mixture of deionized water and butyl Cellosolve were added and thoroughly mixed.

The product was then discharged. It had a Gardner viscosity of H(2 poises).

(C) The ink of part (A) was printed onto a steel panel, and the clear varnish of part (B) was applied over the ink. The printed/coated panel was baked in an oven at 200° C. for two minutes.

The print was exceptionally sharp, glossy, and tough with excellent resistance to abrasion, solvents, and pastuerization; it had a pencil hardness greater than 6H.

EXAMPLE 7

The procedure of Example 5 was repeated except that the following colorants were used instead of phthalocyanine blue: phthalocyanine green, benzidine yellow, and titanium dioxide. The results were comparable.

EXAMPLE 8

The procedure of Example 5 was repeated with each of the following catalysts instead of p-toluenesulfonic acid: blocked p-toluene sulfonic acid, methanesulfonic acid, phophoric acid, oxalic acid, dinonylnaphthalene disulfonic acid, and sulfuric acid. The results were comparable.

EXAMPLE 9

The procedure of Example 6 was repeated with each of the following crosslinking agents instead of hexamethoxymethyl melamine: benzoguanamine, urea, glycouril, and a partially methylated melamine resin. The results were comparable.

EXAMPLE 10

The procedure of Example 1 was repeated except that each of the following was used instead of lauric acid: stearic acid, palmitic acid, oleic acid, and refined tall oil fatty acid. The results were comparable.

EXAMPLE 11

The procedure of Example 1 was repeated except that each of the following was used instead of tall oil rosin: wood rosin and dehydrogenated rosin. The results were comparable.

EXAMPLE 12

The procedure of Example 1 was repeated except that each of the following was used instead of trimethylolpropane: glycerol and hexane triol. The results were comparable.

EXAMPLE 13

The procedure of Example 1 was repeated except that each of the following was used instead of trimellitic anhydride: maleic anhydride, fumaric acid, and tetrahydrophthalic anhydride. The results were comparable.

EXAMPLE 14

A clear coating material was prepared as follows:

(A) 23.5 Parts of lauric acid and 31 parts of tall oil rosin were charged into a reactor equipped as in Example 1. Heating was started and continued until the mixture was uniform; at 110° C., 32 parts of trimethylolpropane was added and the temperature increased to 270° C. Acid numbers were taken until a value of 4.2 was achieved. The reaction was cooled to 180° C., and 13.5 parts of trimellitic anhydride was added. The temperature was held at 180° C. until an acid number of 39 was reached. The polyester product was cooled and discharged. It had a color of 8, a Brookfield viscosity of 18,000 poises, and a hydroxyl number of 200.

(B) 50 Parts of the 100%-solids polyester of part (A) was blended with 50 parts of hexamethoxymethyl melamine, 3 parts of N,N-dimethylethanol amine, and 3 parts of p-toluenesulfonic acid to give a material with a Brookfield viscosity of 500 posies.

(C) The product of part (B) was coated onto a steel substrate and baked in an oven at 200° C. for two minutes. The coating was very glossy and tough and had excellent resistance to abrasion, solvents, and boiling water.

The 100-percent solids rosin-modified polyesters of this invention meet the high performance standards for resins for printing inks and clear coating compositions with regard to pigment wetting, rheology, cure rate with crosslinking agents, gloss, chemical resistance, pasteurization resistance, press stability, and hardness. They are generally viscous liquids that have an excess of hydroxyl and carboxyl groups, and they react readily with crosslinking resins both in clear coatings and in the presence of organic or inorganic colorants.

What is claimed is:

1. A process for preparing a 100%-solids polyester which consists of the steps of (1) heating at about 250° to 290° C. (a) a polyol, (b) a monobasic aliphatic carboxylic acid, and (c) rosin or a modified rosin until a product having an acid number of about 1 to 10 is obtained; (2) heating at about 150° to 210° C. the product of step (1) with (d) a polycarboxylic acid or anhydride; and (3) recovering a 100%-solids polyester product having an acid number of about 20 to 90, a hydroxyl number of about 20 to 400, and a molecular weight of about 100 to 1500.

2. A process for preparing a 100%-solids polyester which consists of the steps of (1) heating at about 250° to 290° C. (a) 25≧60 parts of a polyol, (b) 5–50 parts of a monobasic aliphatic carboxylic acid, and (c) 5–95 parts of rosin or modified rosin until a product having an acid number of about 1 to 10 is obtained; (2) heating at about 150° to 210° C. the product of step (1) with (d) 10–30 parts of a polycarboxylic acid or anhydride; and (3) recovering a 100%-solids polyester product having an acid number of about 20 to 90, a hydroxyl number of about 20 to 400, and a molecular weight of about 100 to 1500.

3. A 100%-solids polyester prepared by the process of claim 2.

4. In a solvent-free printing ink which comprises a resin, a crosslinking agent, a catalyst, and a colorant, the improvement wherein the resin is the 100%-solids polyester prepared by the process of claim 2.

5. In a coating composition which comprises a resin, a crosslinking agent, and a catalyst, the improvement wherein the resin is the 100%-solids polyester prepared by the process of claim 2.

6. A solvent-free printing ink which comprises (1) the 100%-solids polyester prepared by the process of claim 2, (2) a crosslinking agent, (3) a catalyst, and (4) a colorant.

7. A coating composition which comprises (1) the 100%-solids polyester prepared by the process of claim 2, (2) a crosslinking agent, and (3) a catalyst.

* * * * *

UNITED STATES PATENT AND TRADEMARK OFFICE
CERTIFICATE OF CORRECTION

PATENT NO. : 4,368,316
DATED : January 11, 1983
INVENTOR(S) : Sudhir L. Laddha and Theodore Sulzberg It is certified that error appears in the above-identified patent and that said Letters Patent are hereby corrected as shown below:

Column 3, line 5, change "coolant" to -- colorant --.

Column 6, line 44, change "posies" to -- poises --.

Column 7, line 7, between "25" and "60" change the sign to a dash.

Signed and Sealed this

Twenty-ninth Day of March 1983

[SEAL]

*Attest:*

GERALD J. MOSSINGHOFF

*Attesting Officer*     *Commissioner of Patents and Trademarks*